US011865876B2

(12) United States Patent
Agarwal et al.

(10) Patent No.: US 11,865,876 B2
(45) Date of Patent: Jan. 9, 2024

(54) SYSTEM AND METHOD FOR REAL-TIME HEALTH PREDICTION OF TIRES

(71) Applicant: Tata Consultancy Services Limited, Mumbai (IN)

(72) Inventors: Shashank Agarwal, Pune (IN); Saurabh Jaywant Desai, Pune (IN); Venkataramana Runkana, Pune (IN)

(73) Assignee: Tata Consultancy Services Limited, Mumbai (IN)

(*) Notice: Subject to any disclaimer, the term of this patent is extended or adjusted under 35 U.S.C. 154(b) by 279 days.

(21) Appl. No.: 17/463,603

(22) Filed: Sep. 1, 2021

(65) Prior Publication Data

US 2022/0219498 A1 Jul. 14, 2022

(30) Foreign Application Priority Data

Dec. 15, 2020 (IN) .............................. 202021054599

(51) Int. Cl.
*B60C 23/04* (2006.01)
*B60C 11/24* (2006.01)
(Continued)

(52) U.S. Cl.
CPC ........ *B60C 23/0479* (2013.01); *B60C 11/246* (2013.01); *B60C 23/0488* (2013.01);
(Continued)

(58) Field of Classification Search
None
See application file for complete search history.

(56) References Cited

U.S. PATENT DOCUMENTS 9,050,864 B2 * 6/2015 Singh ..................... G01M 17/02
2016/0009290 A1 * 1/2016 Benedict ............. B60C 23/0479
701/34.4
(Continued)

FOREIGN PATENT DOCUMENTS

EP 3574380 A1 12/2019

OTHER PUBLICATIONS

Meissner et al., "Digital Transformation in Maintenance on the Example of a Tire Pressure Indicating System," Int. Workshop on Aircraft System Technologies (2019).

*Primary Examiner* — Matthew G Marini
(74) *Attorney, Agent, or Firm* — Finnegan, Henderson, Farabow, Garrett & Dunner, LLP

(57) ABSTRACT

This disclosure relates to a method and system for real time prediction of tire remaining useful life using a tire digital twin. Herein, the digital twin of the tire monitors a plurality of tires while accounting for runtime as well as parking operation of tires. During runtime, tire goes through multiple operational changes, therefore, the system is configured to estimate the operational changes. The estimation is done in the form of index, which is compared with the manufacturers' recommended value. Similarly, while vehicle is parked, tire still goes through changes which play an important role in its overall health, like, long pending wheel rotation can lead to flat spot. Tire inflation can change owing to cool down effect as well as uncontrolled natural leakages. Further, these parameter indexes are clubbed together to calculate the health index of the tire, which is used to estimate the tire's current remaining useful life.

13 Claims, 11 Drawing Sheets

(51) Int. Cl.
*B60C 23/06* (2006.01)
*B60C 23/20* (2006.01)

(52) U.S. Cl.
CPC ............ *B60C 23/064* (2013.01); *B60C 23/20* (2013.01); *B60C 2200/04* (2013.01)

(56) References Cited

U.S. PATENT DOCUMENTS

2017/0286572 A1  10/2017  Hershey et al.
2018/0210436 A1   7/2018  Burd et al.
2019/0138970 A1   5/2019  Deutsch et al.

* cited by examiner

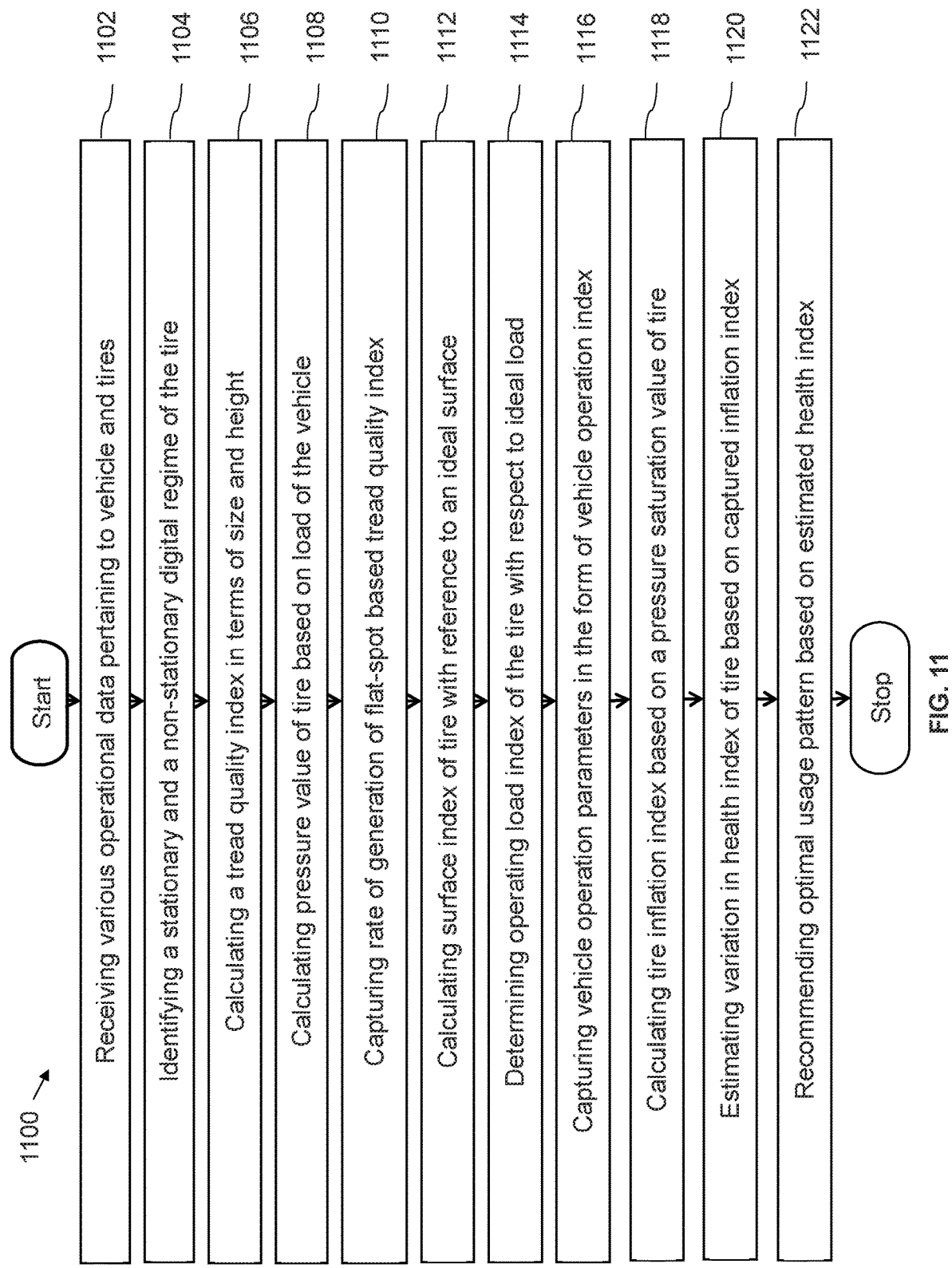

SYSTEM AND METHOD FOR REAL-TIME HEALTH PREDICTION OF TIRES

CROSS-REFERENCE TO RELATED APPLICATIONS AND PRIORITY

This U.S. patent application claims priority under 35 U.S.C. § 119 to India Application No. 202021054599, filed on Dec. 15, 2020. The entire content of the abovementioned application is incorporated herein by reference.

TECHNICAL FIELD

The disclosure herein generally relates to the field of health analysis of tires, and specifically, to a method and system for real time prediction of remaining useful life of at least one tire using a tire digital twin.

BACKGROUND

Tires serve as one of the most critical parts of any automobile system. Also, it is a component which requires continuous monitoring in terms of maintaining adequate pressure and a periodic check on any signs of wear and tear. Tires recently attracted quite a lot of attention with the advent of intelligent prognostic and diagnostic solutions. Lot of physical sensors as well as numerical methodologies have been designed around continuous monitoring of various tire specific parameters, namely, tire pressure and temperature, and estimating or predicting tire wear and tear from tire tread size perspective. Even further, recently researchers are focusing on estimating friction coefficient of the surface, loading on tires, adhesive coefficient of the wheel, etc. with the objective of appending this information for optimal tractive effort calculation.

Apparently, a lot of work revolves around making tire an intelligent commodity. With the advent of all the advanced research focused towards estimating different working aspects of a tire, a comprehensive view of tire can be created. For example, a remaining useful life (RUL) of a tire is dependent on several variables, either measured or estimated by means of data-driven or physics-based models. Most of the current research is focused on creating the individual components, and hence does not provide a comprehensive view of the tire.

SUMMARY

Embodiments of the disclosure present technological improvements as solutions to one or more of the abovementioned technical problems recognized by the inventors in conventional systems. For example, in one embodiment, a system and method for real time prediction of remaining useful life of at least one tire using a tire digital twin is provided.

In one aspect, the processor-implemented method comprising receiving, via an input/output interface, one or more vehicular data, pressure of the tire, temperature of the tire, and information on vehicle longitudinal and translational forces, identifying a stationary digital regime of the at least one tire of the vehicle and identifying a non-stationary digital regime of the at least one tire of the vehicle. A tread quality index in terms of a tread size and a tread height against a predefined threshold value is calculated and rate of generation of at least one flat spot of the tire is captured based on the calculated tread quality index, the calculated pressure value of the tire, ambient temperature, the vehicle load, and type of surface. Further, the method calculates a surface index of the tire with respect to a predefined ideal surface for the at least one tire and determines an operating load index of the at least one tire with respect to a predefined ideal load on the tire. Furthermore, the method comprising capturing one or more vehicle operation parameters in the form of vehicle operation index, and calculating a tire inflation index based on a pressure saturation value of the tire, ambient temperature, initial temperature with tire, vehicle speed, initial pressure value within tire, the calculated surface index, the determined operating load index, and the calculated vehicle operation index. A variation in health index of the tire is estimated based on the captured flat spot of the tire, the calculated tread quality index, the set of historical operational data of the tire, and the calculated pressure value of the tire in a non-operating mode and an optimal usage pattern is recommended based on the estimated health index of the tire of the running vehicle under different environment conditions and at different vehicle speeds as one of a plurality of operating or non-operating constraints.

In another aspect, a system for real time prediction of remaining useful life of at least one tire using a tire digital twin is provided. The system includes an input/output interface configured to receive one or more vehicular data, pressure of the tire, temperature of the tire, and 5 information on vehicle longitudinal and translational forces, at least one memory storing a plurality of instructions and one or more hardware processors communicatively coupled with the at least one memory, wherein the one or more hardware processors are configured to execute the plurality of instructions stored in the at least one memory.

Further, the system is configured to identify a stationary digital twin regime and a non-stationary digital twin regime of the tire of a predefined vehicle. It would be appreciated that the stationary digital twin regime when the predefined vehicle is stationary in one of its predefined position and the non-stationary digital twin regime when the predefined vehicle is running under different environment conditions and at different vehicle speed with a predefined pressure value in the tire. Furthermore, the system is configured to calculate a tread quality index in terms of a tread size and a tread height against a predefined threshold value, calculate a pressure value of the tire in a non-operating mode as a cool down pressure value of tire based on load on the tire, predefined tire material characteristics and ambient temperature, and capture rate of generation of at least one flat spot of the tire based on the calculated tread quality index, the calculated pressure value of the tire, ambient temperature, the vehicle load and type of surface using the identified stationary digital twin regime for the stationary digital twin regime of the tire.

Furthermore, the system is configured to calculate a surface index of the tire with respect to a predefined ideal surface for the tire, 5 determine an operating load index of the tire with respect to a predefined ideal load on the tire, capture one or more vehicle operation parameters in the form of vehicle operation index, calculate a tire inflation index based on a pressure saturation value of the tire, ambient temperature, initial temperature with tire, vehicle speed, initial pressure value within tire, the calculated surface index, the determined operating load index, and the calculated vehicle operation index. Further, the system is configured to estimate variation in a health index of the tire based on the calculated tire inflation index, and the set of historical operational data of the tire and recommending optimal usage pattern based on the estimated health index of the tire of the running vehicle under different environment conditions and at different vehicle speed as one of a plurality of operating constraints.

In yet another aspect, a non-transitory computer readable medium storing one or more instructions which when executed by one or more processors on a system cause the one or more processors to perform the method is provided. The non-transitory computer readable medium for real time prediction of remaining useful life of at least one tire using a tire digital twin is provided. The method includes one or more steps such as receiving, via an input/output interface, one or more vehicular data, pressure of the tire, temperature of the tire, and information on vehicle longitudinal and translational forces, identifying a stationary digital regime of the at least one tire of the vehicle and identifying a non-stationary digital regime of the at least one tire of the vehicle. A tread quality index in terms 5 of a tread size and a tread height against a predefined threshold value is calculated and rate of generation of at least one flat spot of the tire is captured based on the calculated tread quality index, the calculated pressure value of the tire, ambient temperature, the vehicle load, and type of surface. Further, the method calculates a surface index of the tire with respect to a predefined ideal surface for the at least one tire and determines an operating load index of the at least one tire with respect to a predefined ideal load on the tire. Furthermore, the method comprising capturing one or more vehicle operation parameters in the form of vehicle operation index, and calculating a tire inflation index based on a pressure saturation value of the tire, ambient temperature, initial temperature with tire, vehicle speed, initial pressure value within tire, the calculated surface index, the determined operating load index, and the calculated vehicle operation index. A variation in health index of the tire is estimated based on the captured flat spot of the tire, the calculated tread quality index, the set of historical operational data of the tire, and the calculated pressure value of the tire in a non-operating mode and an optimal usage pattern is recommended based on the estimated health index of the tire of the running vehicle under different environment conditions and at different vehicle speeds as one of a plurality of operating or non-operating constraints.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 11 is a flow diagram to illustrate a method for real time prediction of remaining useful life of at least one tire using a tire digital twin, in accordance with an embodiment of the present disclosure.

DETAILED DESCRIPTION OF EMBODIMENTS

Figure 1:
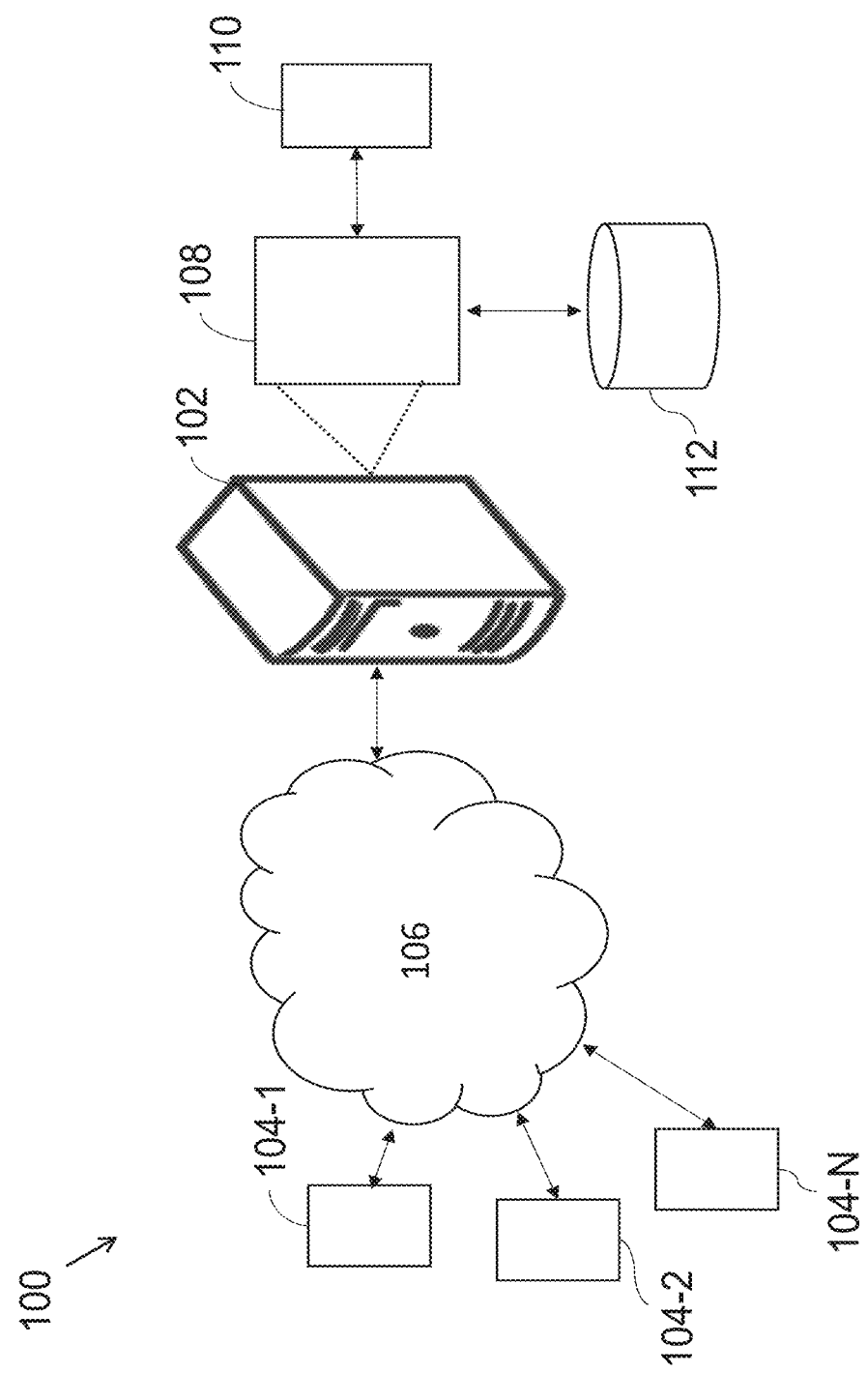
FIG. 1 illustrates an exemplary system for real time prediction of remaining useful life of at least one tire using a tire digital twin, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Referring now to the drawings, and more particularly to FIG. 1 through 11, where similar reference characters denote corresponding features consistently throughout the figures, there are shown preferred embodiments and these embodiments are described in the context of the following exemplary system and/or method.

FIG. 1 illustrates a block diagram of a system (100) for real time prediction of remaining useful life of at least one tire using a tire digital twin, in accordance with an example embodiment. Although the present disclosure is explained considering that the system (100) is implemented on a server, it may be understood that the system (100) may comprises one or more computing devices, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

In the preferred embodiment, the system (100) is configured for real time prediction of remaining useful life of at least one tire using a tire digital twin. It would be appreciated that the tire digital twin herein comprises 5 of a stationary digital twin regime of the tire and a non-stationary digital twin regime of the tire. The stationary digital twin regime is referred when the predefined vehicle is stationary in one of its predefined positions and the non-stationary digital twin regime when the predefined vehicle is running under different environmental conditions and at different vehicle speed with a predefined pressure value in the tire. Herein, the digital twin of the tire, which monitors a plurality of tires while accounting for runtime as well as parking operation of each of the plurality of tires. During runtime, the tire goes through multiple operational changes. Therefore, the system is configured to estimate the operational changes such as different kind of sources, tractive forces, and pressure below or higher than optimal pressure value. It is to be noted that the estimation is done in the form of an index, which is compared with the predefined manufacturer's recommended value. Similarly, while vehicle is parked, tire still goes through changes which play an important role in its overall health, for example, tire being stationary for a long time without wheel rotation can lead to a flat spot. Tire inflation can change owing to cool down effect as well as uncontrolled natural leakages. Further, these parameter indexes are clubbed together to calculate the health index of the tire, which is then used to estimate the current remaining useful life of the tire.

In the preferred embodiment, the system (100) is configured for executing a digital twin regime of a stationary tire. The system (100) comprises at one or more databases (112) and one or more hardware 5 processors (108) which are communicatively coupled with the at least one memory (102) to execute a plurality of modules (110) therein.

Figure 2:
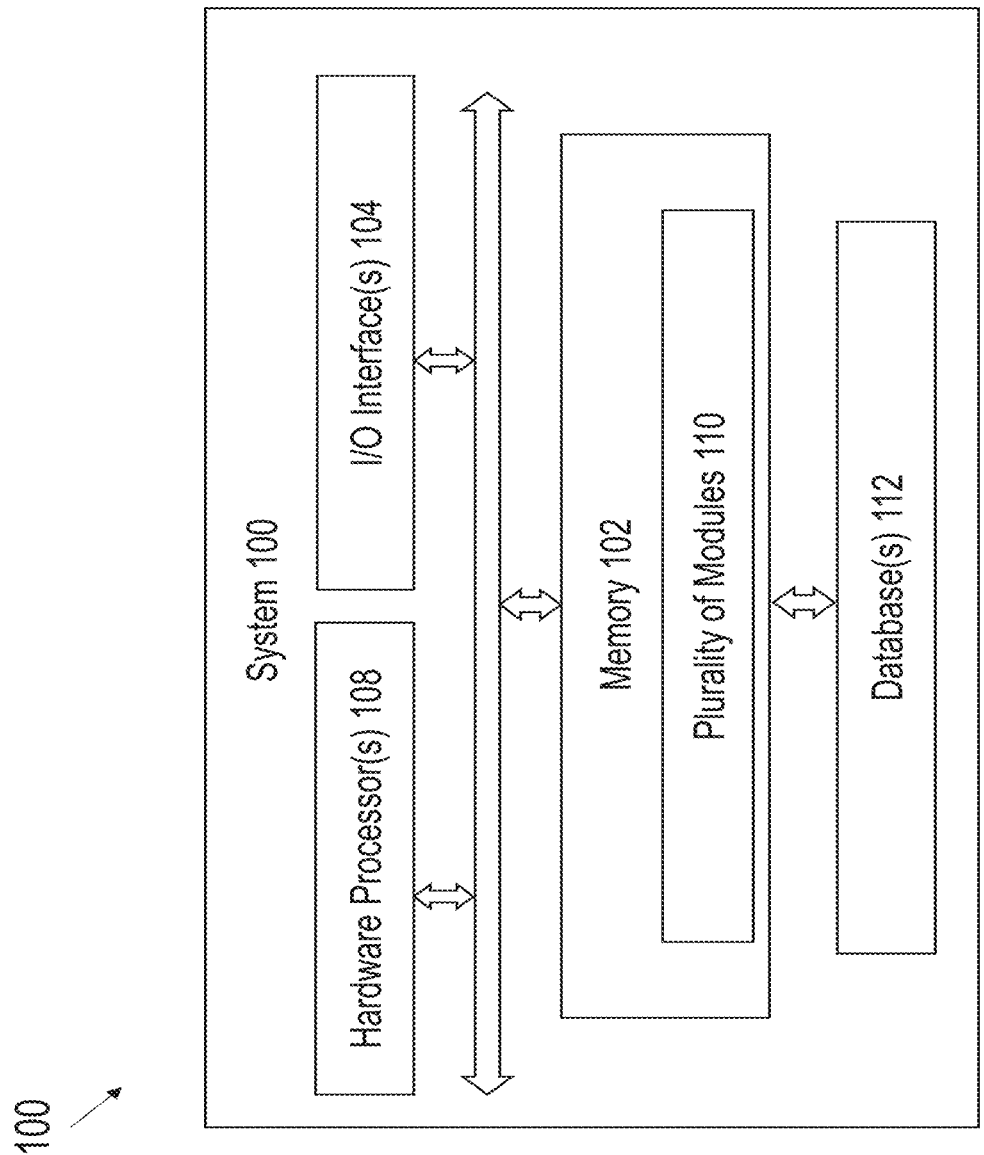
FIG. 2 is a functional block diagram to illustrate one or more modules of the system, according to an embodiment of the present disclosure.

Referring FIG. 2, wherein a block diagram is used to illustrate the plurality of modules (110) of the system (100). Herein, the input/output interface (104) is configured to receive real-time and non-real-time data from various databases at a pre-determined frequency (e.g. 1/second, 1/minute, 1/hour, etc.; frequency is configurable by the user). Real-time data includes vehicle operations data and environment data. Vehicular data is recorded by sensors in the vehicle and includes temperatures, pressures, flow rates and vibrations from processes and equipment in the tires of the vehicle. Environmental data such as ambient temperature, atmospheric pressure, ambient humidity, rainfall, etc. is also recorded by sensors and is stored in an environment database. Information related to the condition of the vehicle, vehicle running status, maintenance activities performed on the tires, etc. is stored and retrieved from a maintenance database.

Figure 3:
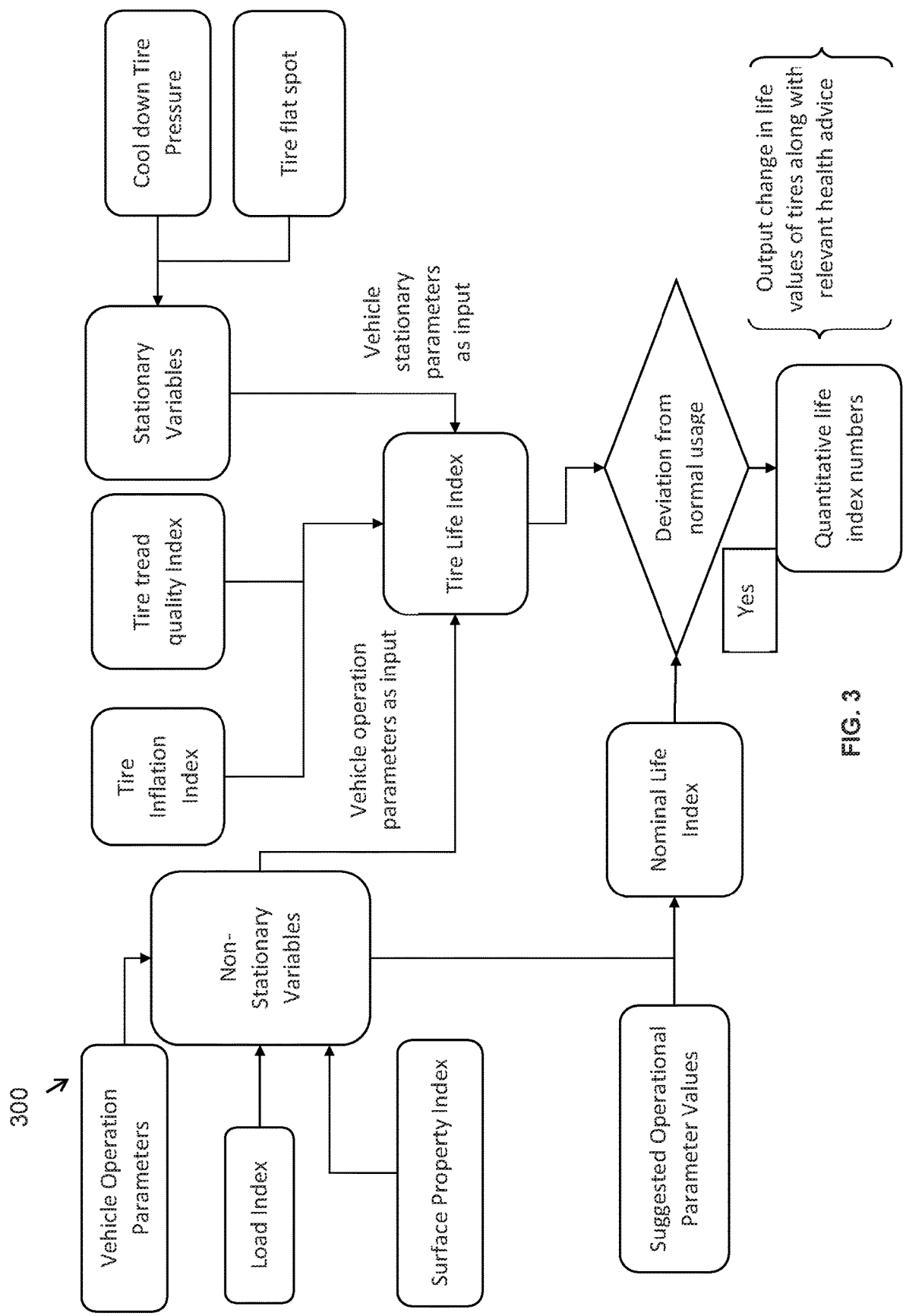
FIG. 3 is a functional block diagram to illustrate a tire digital twin, according to an embodiment of the present disclosure.

Referring FIG. 3, to illustrate a functional block diagram of a system (100) for real time prediction of tire remaining useful life using a tire digital twin, wherein a platform is offered which provides one or more real time insights on the usage of tires under different usage and environmental conditions, based on which, further developmental decisions can be taken by the manufacturers and fleet owners. Further, two separate modules are proposed, a first module and a second module. The first module resides in the vehicle, gathers all sort of vehicular and tire specific data, performs 5 simple computations utilizing pre-built models to estimate specific parameters giving quick insight into the tire operations like loading of the vehicle, pressure/temperature of the tire, vehicle longitudinal/translational forces, etc. The second module resides in a cloud based network and performs computationally expensive tasks like model evaluation, RUL estimation, etc. as well as form a connected infrastructure, giving one or more insights based on recommended usage of tire (as suggested by the manufacturer and the fleet operator) and current best usage from available real world exemplary usage of similar vehicles/tire units. The one or more insights includes usage behavior of the tire, geography dependent product customization, overall product level optimization.

In the preferred embodiment, the system (100) is configured to perform pre-processing of the real-time and non-real-time data received from multiple databases of the vehicle. The pre-processing involves removal of redundant data, unification of sampling frequency, outlier identification & removal, imputation of missing data, synchronization, and integration of variables from multiple data sources.

In the preferred embodiment, the system (100) is configured to identify a stationary digital regime of the tire of a predefined vehicle. It would be appreciated that herein the predefined vehicle is stationary in one of its predefined positions. The stationary digital regime of the tire includes aspects when the vehicle is stationary in one of its given position. The stationary digital regime aims at monitoring and estimating various 5 parameters during stationary time of vehicle operation as well separately, as this is not usually captured.

Figure 4:
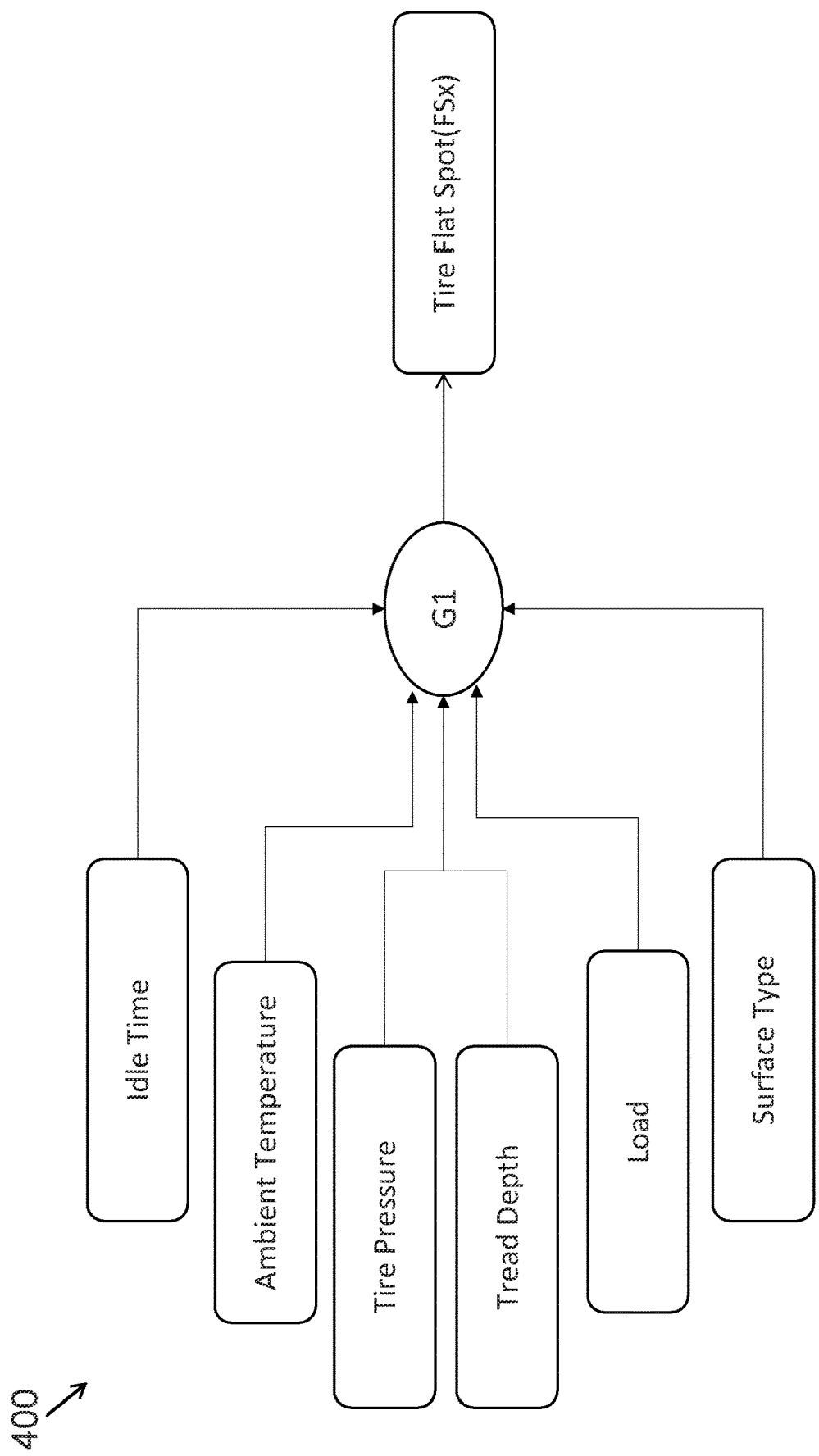
FIG. 4 is a functional block diagram to compute the tire flat spot, according to an embodiment of the present disclosure.

It would be appreciated that tire flat spot happens at the tire-surface contact area and is one of the major issues any vehicle goes through while the vehicle is in a stationary state for a long time. It happens due to the stresses generated and is a function of various variables, as shown in FIG. 4. Flatness results in permanent tire deformation and can lead to a catastrophic failure.

Figure 5:
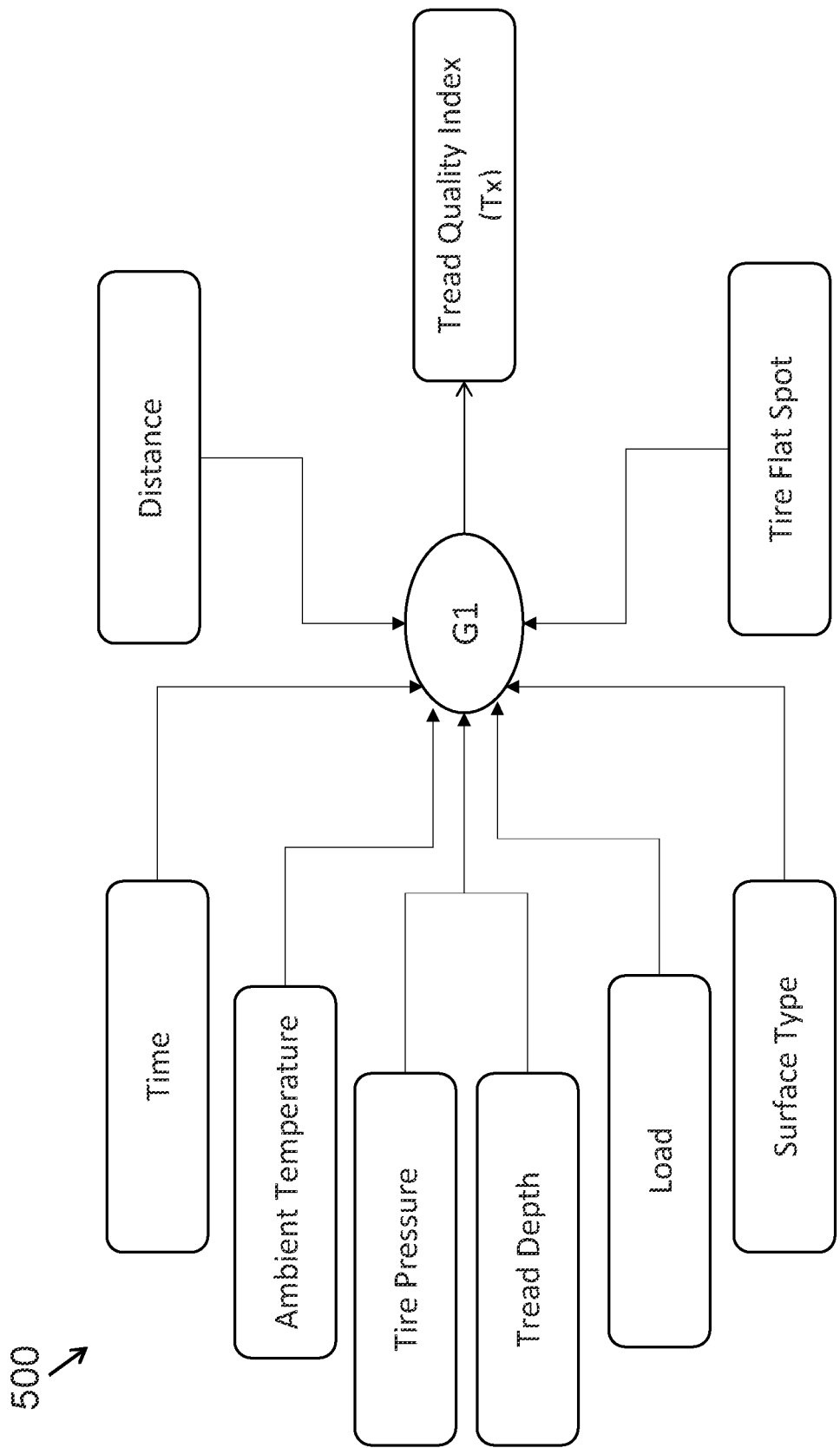
FIG. 5 is a functional block diagram to calculate the tread quality index of the tire, according to an embodiment of the present disclosure.

Referring FIG. 5, a functional block diagram, wherein the system (100) is configured to calculate a tread quality index in terms of a tread size and a tread height against a predefined threshold value. It is to be noted that the tread quality index is calculated based on a set of historical operational data of the tire. Manufacturer provides the specific tread height/size threshold below which warranty does not apply to tires and it is declared as a worn-out tire. The tread quality index is calculated based on historical operational data of the tire (when it was running). When the vehicle is stationary, the operational data is gathered and processed to find the index. It is practical to process it when vehicle is stationary, as it provides the insight about tire condition in the form of an index before operation to decide if there is need to replace the tire.

Tread quality is an important parameter to infer the tire working condition. Manufacturers often provide the minimum tread depth as an index for tread quality. This insures the safe and hassle-free working of the tire. Thus, tire tread depth is often regarded as one of the key identifiers of tire health. Time based deterioration or erosion of tread size can often act as the single most feature to identify the health of a tire. The measurement or even estimation of tread size is not straightforward and requires either expensive sensors to be installed or have a high uncertainty associated with it. For this reason, a tread related parameter in the form of a standardized index can be used in combination with other parameters as an input to the stationary digital regime.

Further, the tread index can be modelled based on physics-based or data-driven techniques as a soft sensor. Tire tread gets affected by many variables and deterioration/erosion mostly happen when vehicle is running. The tread quality index is calculated as a function of time, ambient temperature, tire pressure, tire tread depth, vehicle load, surface type, total distance covered by the tire since installation, etc. All these parameters are captured and estimated by the tire digital twin. The current value of tire depth is estimated as mentioned below using the historical tire operations data:

$$T_x = g_2(X_{time}, X_{amb}, X_p, X_{td}, X_l, X_s, X_d)$$

wherein, $g_2$ is underlying function, $X_{time}$ is a time component, $X_{amb}$ is ambient temperature component, $X_p$ is pressure component, $X_{td}$ is tire tread depth, $X_l$ is load component, and $X_s$ is surface type component, $X_d$ is component of distance.

Figure 6:
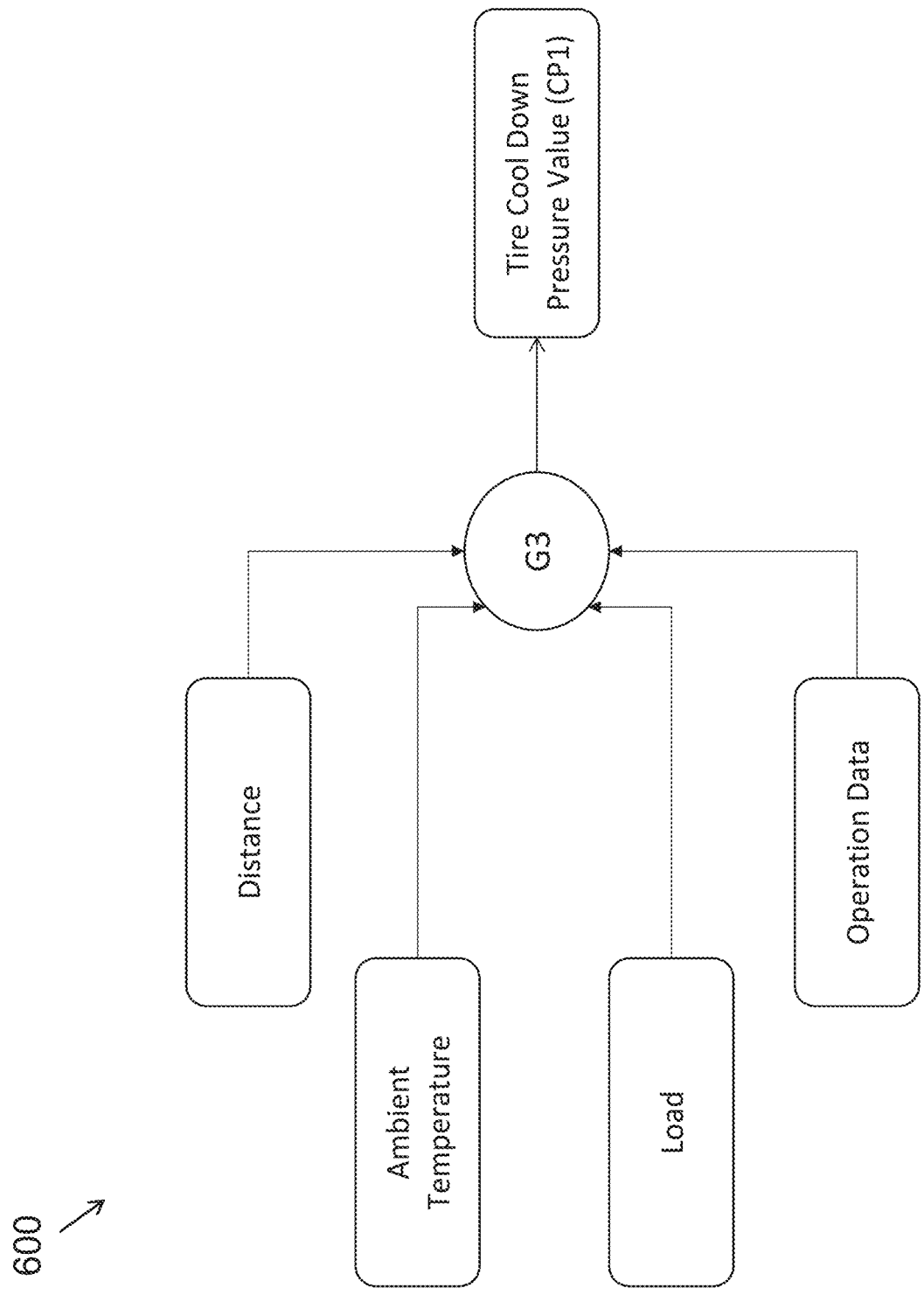
FIG. 6 is a functional block diagram to calculate the cool down pressure value of the tire, according to an embodiment of the present disclosure.

Referring FIG. 6, a functional block diagram, wherein the system (100) is configured to calculate a pressure value of the tire in a non-operating mode as a cool down pressure value of the tire based on load on the tire, predefined tire material characteristics and ambient temperature. The tire cool down pressure provides a baseline pressure value for training a model. The tire cool down pressure can be different from the running vehicle tire pressure. Tire pressure is a function of tire temperature. During vehicle operation, tire temperature increases and thus the pressure tends to be slightly higher than the non-operating tire pressure where temperature is at its normal level. Tire cool down pressure provides a baseline pressure value, which can have the most accurate prediction accuracy for trained models.

Further, the air pressure varies due to leakage even while vehicle is resting. This drop can be estimated based on various parameters such as load on tire, tire material characteristics, and ambient temperature. Overall, cool down pressure can be estimated as a function of ambient temperature, vehicle load, total distance covered by the tire since last air filling, other vehicle operational data, etc. as given below:

$$CP_x = g_3(X_{amb}, X_l, X_{d2}, X_{op})$$

wherein, $g_2$ is underlying function, $X_{time}$ is a time component, $X_{amb}$ is ambient temperature component, $X_p$ is pressure component, $X_{td}$ is tire tread depth, $X_l$ is load component, $X_s$ is surface type component, and $X_d$ is component of distance.

In the preferred embodiment, the system (100) is configured to capture rate of generation of at least one flat spot of the tire based on the calculated tread quality index, the calculated pressure value of the tire, ambient temperature, the vehicle load, and type of surface using the identified stationary digital regime. It has to be noted that when vehicle is not operating for a long time, load of the vehicle is continuously applied on the tire where tire is in contact with the road surface. The pressure witnessed by the contact area acts as a stress. These stresses can result in tire deformation, and a phenomenon known as creep effect occurs. Under prolonged stresses, a permanent deformation of the tire happens, making the tire obsolete for further use. These stresses can be captured as a function of time, ambient temperature, estimated pressure value inside the tire, estimated tire tread depth, vehicle load, surface type etc. as mentioned below:

$$FS_x = g_1(X_{time}, X_{amb}, X_p, X_{td}, X_l, X_s)$$

wherein, $FS_x$ defines the tire flat spot measured as a time averaged vector in different positions of tire, $g_1$ is underlying function, $X_{time}$ is a time component, $X_{amb}$ is ambient temperature component, $X_p$ is pressure component, $X_{td}$ is tire depth, $X_l$ is load component, and $X_s$ is surface type component.

It should be noted that the tire non-uniformity caused due to flat-spots often induces shake and shimmy (back and forth oscillation of steering wheel) vibration in vehicles due to increased tire-wheel force variation, especially when a vehicle is started, after a long storage or non-usage. While these vibrations act as a signature of tire flat spot, they again lead to further wear & tear losses related to tire. Herein, the underlying function $FS_x$ is a model which takes into account various factors leading to tire flat spot over time, utilizing historical data and information. The digital twin comprises of various modules and the data follows model development pipeline including data cleaning, regime identification, KPI identification, feature identification and selection, and model building.

In the preferred embodiment, the system (100) is configured to estimate the change in nominal health index of the tire utilizing one or more of stationary digital regime parameters such as possibility of flat spot of the tire, the tread quality index, the set of historical operational data of the tire, and the calculated pressure value of the tire in a non-operating mode which leads to both natural as well as forced degradation of the tire.

In another embodiment, the system (100) is configured to identify a non-stationary digital regime of a tire of a predefined vehicle. Herein, the predefined vehicle is running under different environmental conditions and at different vehicle speeds with a predefined pressure value in the tire.

Figure 7:
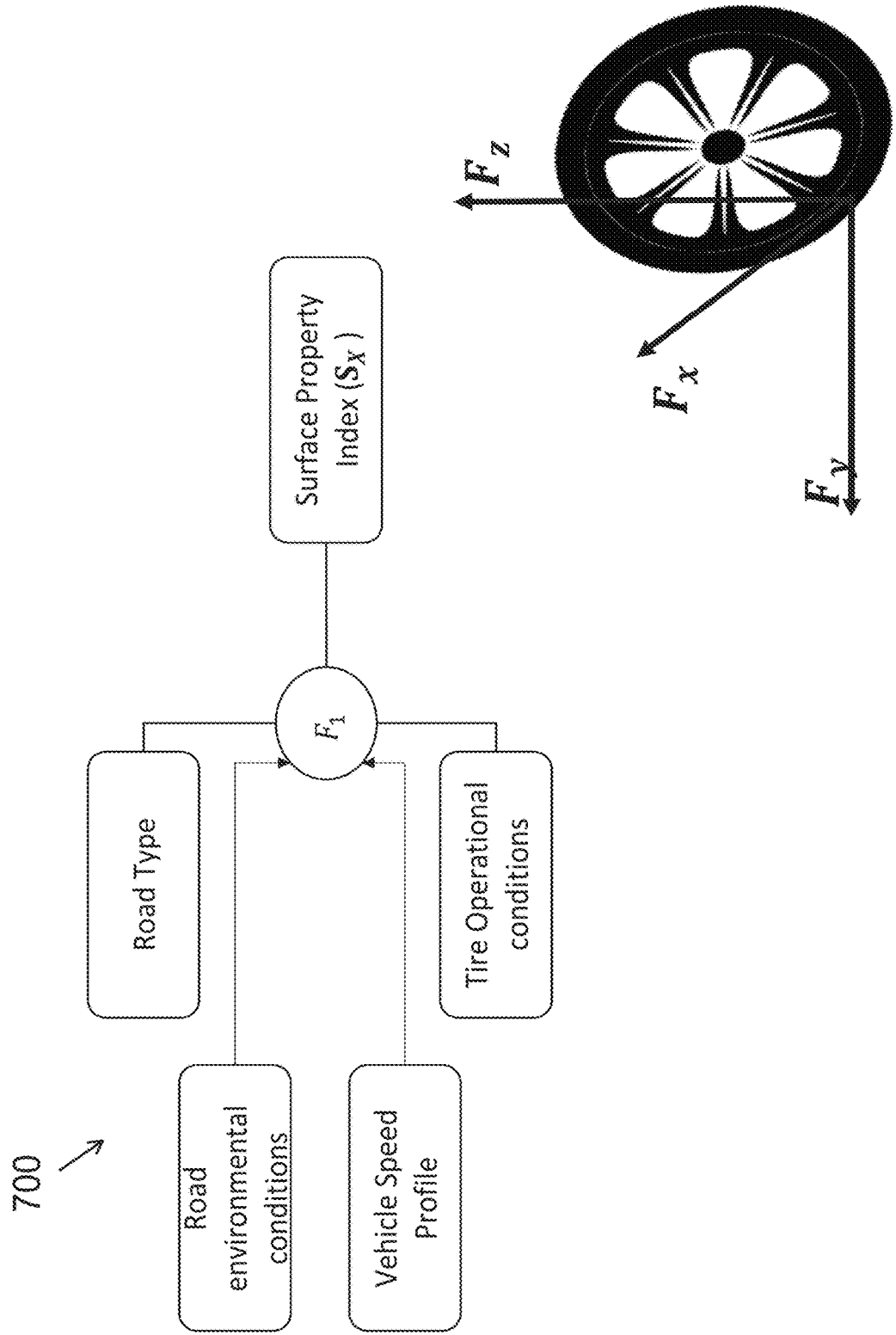
FIG. 7 is a functional block diagram to calculate the surface property index of the tire, according to an embodiment of the present 5 disclosure.

In the preferred embodiment, the system (100) is configured to calculate a surface index of the tire with respect to a predefined ideal surface for the tire, wherein the vehicle operates on a specific surface for a predefined time as shown in FIG. 7. The interaction between a tire and the 5 road surface is a complex combination of stresses and strains that depends on both tire and road related factors (that is, tire material and type, vehicle speed, tire inflation pressure and temperature, road surfacing condition and temperature, road camber, surfacing texture, etc.) It is not simple to quantify the contact interaction for a tire/road combination along a route, but these interactive stresses and strains can be measured and modelled for very specific cases where the various parameters are well defined.

In simple terms, the tire-road interaction stresses happen as a result of normal and shear stresses distributed non-uniformly over the contact patch. Tractive and lateral forces develop through shear mechanisms while a tire rolls on a road surface. This gives rise to a friction coupling between the tire and the road surface. Slip at the tire-road interface is the main factor which contributes or is responsible for both of these mechanisms. The coefficient of friction essentially indicates the difficulty with which the rubber of the tire slips over the road surfacing material. This coefficient depends on tire load, speed, temperature, and road surface characteristics. Friction thus results in varying grip or interlocking which develops with different kind of road surfaces. This leads to the practical situation where the tire-road friction between two similar tires that run on two different surfaces in the two-wheel tracks (or on a dual set of tires) differs, and thus the stresses on the tires differ. For a vehicle that attempts to run in a straight line, this means that the tires on the two axles (or on a dual assembly) run at different speeds, causing one tire to slip more than 5 the other and subsequent heat build-up in the tire.

Based on the explanation as provided above, it is evident that stresses and hence the variation of the tire surfaces even in a single vehicle is different owing to the difference in road surface and load distribution which the tires encounter and the resultant cornering forces owing to the steering of the vehicle.

It is to be noted that the identified non-stationary digital regime of the tire captures surface quality index ($S_x$) of all tires of the vehicle as a time averaged vector while monitoring vehicle slip and average vehicle speed on a specific road surface, as given below:

$$S_x = f_1(X_R, X_E, X_V, X_O)$$

wherein, $f_1$ is a surface property index vector depending on the time averaged values of variables related to road as captured by variable $X_R$, environment variable such as temperature, weather as captured by variable $X_E$, vehicle dependent variable such as vehicle speed, braking and calculated cornering forces as captured by $X_V$ and estimated or measured tire operational variables such as pressure & temperature as captured by variable $X_O$. Further, herein function $f_1$ can be trained using physics based and data driven modeling techniques and serves as a comparative model. It would be appreciated that the surface property index acts as one of the key identifiers used in defining tire health and is monitored and estimated by tire digital twin real time while vehicle is in operation.

In the preferred embodiment, the system (100) is configured to determine an operating load index of the tire with respect to a predefined ideal load on the tire. The operating load index includes one or more operation parameters such as a braking force, and a tractive force. Tire operating load index is determined for a specific time. This parameter acts as a load value with respect to the ideal load of the tire. The load index also takes into account vehicle operations. Tire load is related to vehicle mass and axle load distribution, and therefore, also to actual loading conditions. Under specific braking, driving, or cornering conditions, roll and pitch will occur, and tire loads will change, leading to different response of the tire-road contact in terms of tire forces. For any installed tire unit, manufacturers give a tire load index value, which is a pre-calculated value. It specifies the maximum admissible static load the tire can carry at the speed indicated by the tire's speed rating under certain other conditions such as tire pressure, etc. Defined load index factor considers this static load as the prescribed nominal load of the tire under the given conditions. The Load Index as defined tends to capture these real time load forces as a time averaged vector, and compares it with nominal value of load index ($L_x$) under the given operating conditions, as given below:

$$L_x = f_2(F_Z(X_R, X_E, X_V, X_O), F_{Znom})$$

wherein, $f_2$ is the function which defines the time averaged load index variation with respect to the nominal load value over the complete run time of the tire loaded in the vehicle. It should be noted that $F_{Znom}$ is a function of the maximum vehicle speed allowed under the given optimum value of pressure & temperature and hence will be providing maximum load allowed at any instant of time.

Figure 8:
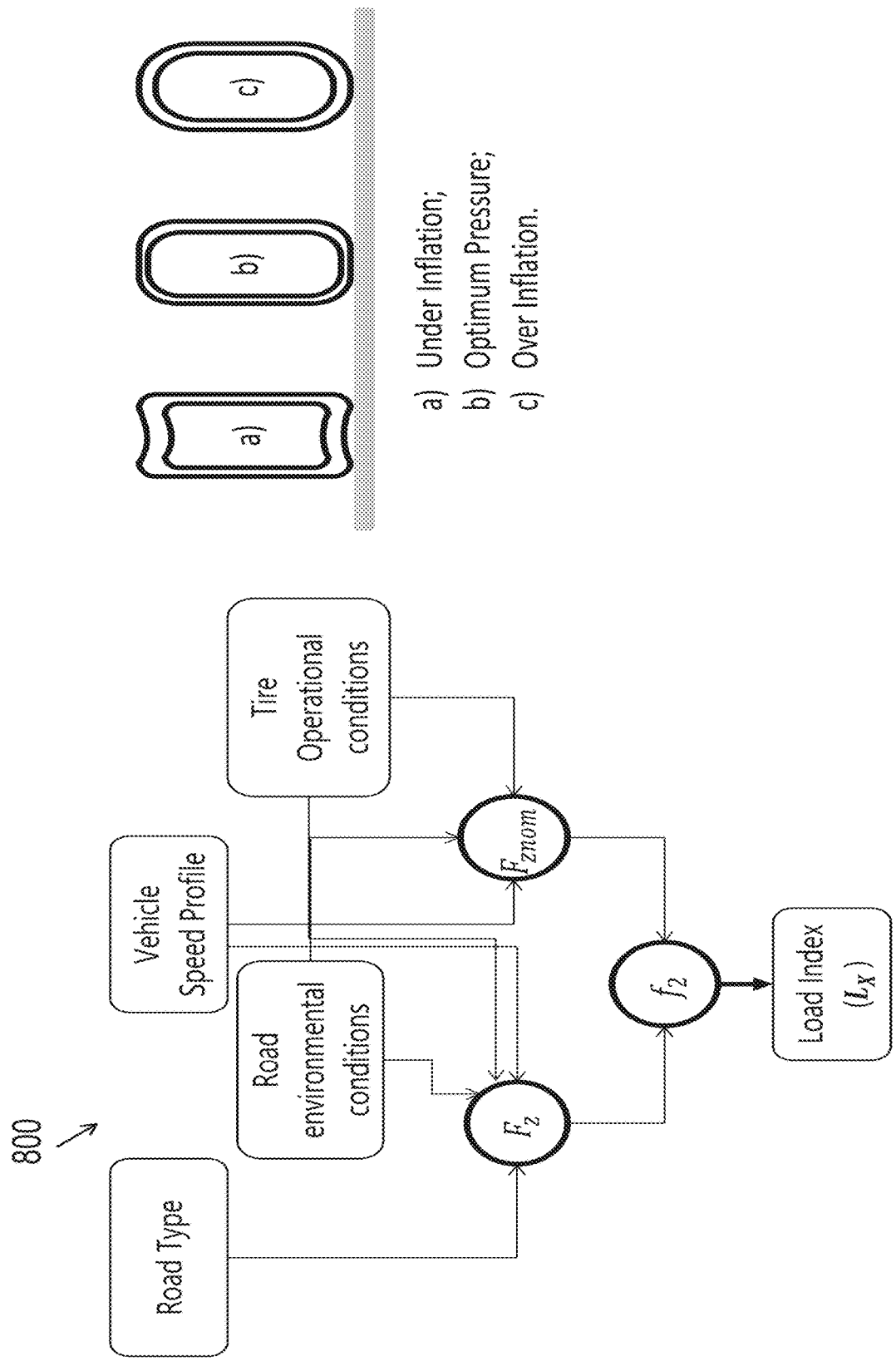
FIG. 8 is a functional block diagram to calculate the operating load index of the tire, according to an embodiment of the present disclosure.

Referring FIG. 8, a functional flow diagram to illustrate calculation of the operating load index. Function $F_Z$ is for real time load estimation, which calculates the nominal value of load under the current scenario. $f_2$ detects the difference between the current and the nominal load value and provides that as the load index which can be used further for tire health index calculations. It should be noted that load index is a comparative value based on recommended or nominal value of the load under current vehicle running conditions.

In the preferred embodiment, the system (100) is configured to calculate a tire inflation index based on a pressure saturation value of the tire, ambient temperature, initial temperature of the tire, vehicle speed, initial pressure value within the tire, the calculated surface index, the determined operating load index, and the calculated vehicle operation index. Maintaining proper tire inflation is essential to vehicle handling, overall tire performance, good fuel efficiency, and load carrying capability. A properly inflated tire will reduce tread movement (giving tire a longer life), reduced rolling resistance (increases fuel efficiency), and increases water dispersion (decreases the possibility of hydroplaning).

In another embodiment, wherein if a tire is over- or underinflated, its footprint will change from optimum contact with the road and parts of the tread will experience excessive movement, which creates and/or accelerates irregular wear. In a tire, pressure monitoring module is used to monitor tire inflation, both with and without pressure measurement systems. Pressure monitoring module uses differential tire speed as well as the relationship of lateral dynamic forces to estimate pressure in any given tire. Tire inflation index is a time averaged vector of the difference between estimated and the suggested pressure value.

$$T_x = f_3(P_i - P_{iest}), \forall i$$

wherein, $P_i$ is the recommended and $P_{iest}$ is the estimated pressure of $i^{th}$ tire with or without using Tire Pressure Monitoring System.

In the preferred embodiment, the system (100) is configured to calculate the time average values of various vehicle operation parameters over the lifetime of the tire. It would be appreciated that the transfer of tractive forces from engine to tire is something which makes the movement of vehicle possible. As explained previously for various modules, combination of tractive forces, wheel slip, & vehicle speed under given tire pressure value plays a critical role in tire deterioration. These parameters once calculated as time averaged vectors act as input variables/parameters for various models developed for tire health index calculations.

In the preferred embodiment, the system (100) is configured to estimate a health index of the tire based on various defined indexes, using the set of historical operational data of the tire. Herein, the tire health index is calculated as a function of both stationary and non-stationary vehicle operational variables. Effect of the tire inflation index, estimated tire 5 tread size, and vehicle operational parameters as estimated by different modules of the digital twin are taken into consideration while estimating the health index parameter. The health index is represented as follows:

$$H_x = \alpha_1 \cdot h_1(FS_x, CP_x) + \alpha_2 \cdot h_2(T_x) + \alpha_3 \cdot h_3(S_x, L_x) + \alpha_4 \cdot h_4(T_x) + \alpha_5 \cdot h_5(V_x)$$

wherein, a, assigns the degree of confidence on the estimated value of index i as estimated and is always between (0, 1). For example, $T_x$ acts as the estimated tread index and as explained before, shall have high associated inaccuracy without sensor-based measurement, in which case $\alpha_2$ will be low. If model of $T_x$ has shown high accuracy or is measurement based, $\alpha_2$ will be assigned a high value, demonstrating a high confidence value. $h_i$ represents nominal variation in the health of the tire with respect to the defined indexes, for example, $h_1$ represents the variation with respect to the tire flat spot and cool down pressure of the tire.

Further, the real time nominal life index parameter is calculated using uncontrollable operational conditions such as surface property index and tire non-operational parameters such as tire flat spot while maintaining tire pressure, vehicle operation & load to the nominal or recommended values. It is to be noted that the nominal life index is compared with the tire life index to understand the deviation of tire from its normal usage.

Figure 9:
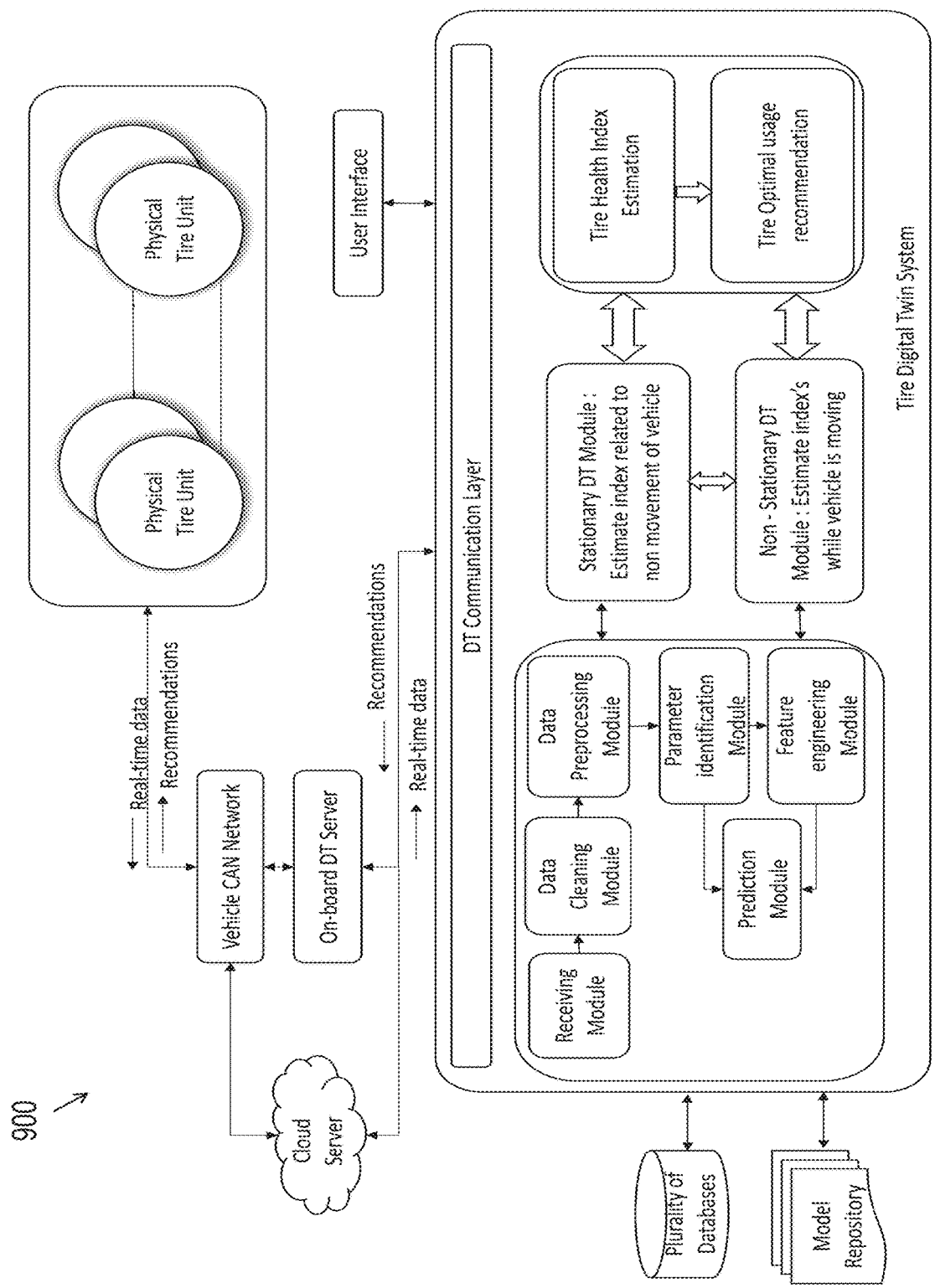
FIG. 9 is a workflow to illustrate quantitative life index numbers, according to an embodiment of the present disclosure.

Referring FIG. 9, a functional block diagram, wherein the system (100) is configured to recommend an optimal usage pattern based on the estimated health index of the tire of the running vehicle under different environmental conditions and at different vehicle speed as one of a plurality of operating constraints. Herein, the recommendation is based on obtained tire health index, real-time usage of tire and digression from the nominal usage. It would be appreciated that the optimization of the tire health index is performed with load on tire and pressure as the optimization constraints. Recommended values of vehicle tractive efforts by means of acceleration and braking act as outputs which define constraints on tire load. Further, the recommendation to maintain tire pressure under different surfaces acts as another recommendation for optimal tire usage.

Figure 10:
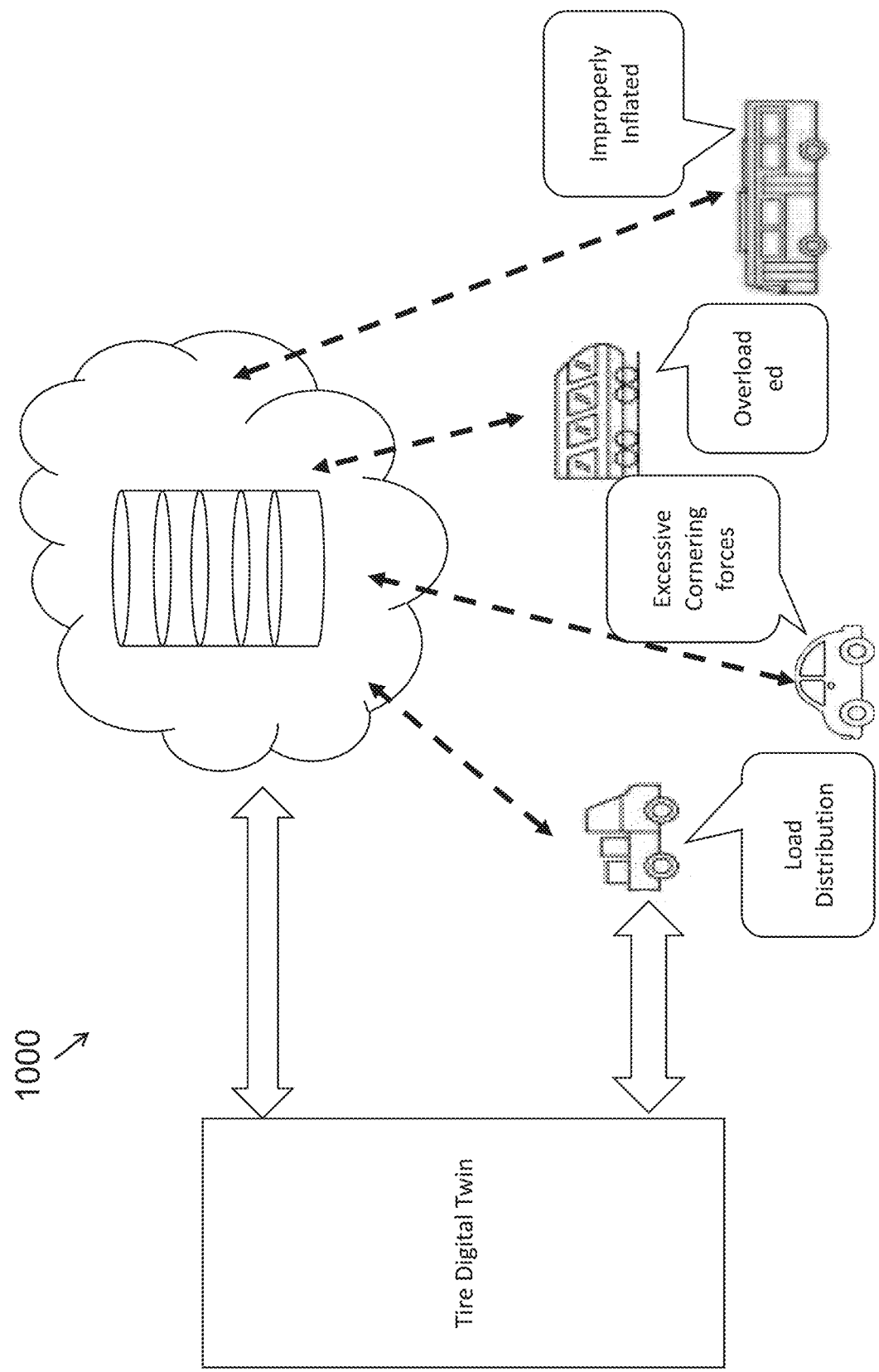
FIG. 10 is a schematic diagram to illustrate the system for real time predictions of the tire remaining useful life using a tire digital twin with multiple different possible scenarios with information transfer happening through a common network, according to an embodiment of the present disclosure.

Referring FIG. 10, to illustrate comparison of real-time tire life index and nominal life index value to check deviation of tire from its normal usage. Real time nominal life index parameter value is also calculated using vehicle uncontrollable operational conditions such as surface property index or tire non-operational parameters such as tire flat spot or effect of tire cool down pressure, vehicle operation and load to the nominal or recommended value.

Referring FIG. 11, to illustrate a processor-implemented method (1100) for real time prediction of tire remaining useful life using a tire digital twin. It would be appreciated that the tire digital twin herein refers a stationary digital regime of the tire and a non-stationary digital regime of the tire. The stationary digital regime when the predefined vehicle is stationary in one of its predefined position and the non-stationary digital 5 regime when the predefined vehicle is running under different environmental conditions and at different vehicle speed with a predefined pressure value in the tire. Herein, the digital regime of the tire is deployed in a cloud network to enable the tire manufacturer to recommend the usage patterns of the at least one tire and use the insights in the design and manufacturing of tires.

Initially, at the step (1102), receiving, via an input/output interface, one or more vehicular data, pressure of the tire, temperature of the tire, and information related to vehicle longitudinal and translational forces.

In the preferred embodiment, at the next step (1104), identifying a stationary digital twin regime and a non-stationary digital regime of the tire of a vehicle. It would be appreciated that the vehicle runs under different environmental conditions and at different vehicle speeds with a predefined pressure value in the tire.

In the preferred embodiment, at the next step (1106), calculating a tread quality index in terms of a tread size and a tread height against a predefined threshold value, wherein the tread quality index is calculated based on a set of historical operational data of the tire.

In the preferred embodiment, at the next step (1108), calculating a pressure value of the tire in a non-operating mode as a cool down pressure value of a tire based on load on the tire, predefined tire material characteristics and ambient temperature. Herein, the tire cool down 5 pressure provides a baseline pressure value for training a data-driven model or a physics-based model.

In the preferred embodiment, at the next step (1110), capturing rate of generation of at least one flat spot of the tire based on the calculated tread quality index, the calculated pressure value of the tire, ambient temperature, the vehicle load and type of surface using the identified stationary digital regime.

In the preferred embodiment, at the next step (1112), calculating a surface index of the tire with respect to a predefined ideal surface for the at least one tire. Herein, the vehicle operates on a specific surface for a predefined time under one or more specific environmental conditions.

In the preferred embodiment, at the next step (1114), determining an operating load index of the at least one tire with respect to a predefined ideal load on the tire. It is to be noted that the operating load index includes one or more operation parameters such as a braking force and a tractive effort.

In the preferred embodiment, at the next step (1116), capturing one or more vehicle operation parameters in the form of vehicle operation index. The one or more vehicle operation parameters include vehicle speed, acceleration, braking profile, and steer angle. Herein, the one or more vehicle operation parameters are stored in the form of time averaged values of the vehicle operation parameters over the lifetime of the 5 tire in the database.

In the preferred embodiment, at the next step (1118), calculating a tire inflation index based on a pressure saturation value of the tire, ambient temperature, initial temperature of the tire, vehicle speed, initial pressure value within the tire, the calculated surface index, the determined operating load index, and the calculated vehicle operation index.

In the preferred embodiment, at the next step (1120), estimating, a variation in health index of the tire based on the captured inflation index of the tire, the calculated tread quality index, the set of historical operational data of the tire, and the calculated pressure value of the tire in a non-operating mode.

In the preferred embodiment, at the last step (1122), recommending, via the one or more hardware processors, an optimal usage pattern based on the estimated health index of the tire of a vehicle running under different environmental conditions and at different vehicle speeds.

In another embodiment, wherein the processor-implemented method comprising calculating current health index of the tire utilizing variation in tire health owing to both stationary and non-stationary digital regimes of the tire as well as overall tread quality index, comparing the calculated current health index with respect to the nominal health index of the tire under recommended usage conditions to calculate deviation from normal usage and defining quantitative remaining useful life of the at least one tire of the vehicle utilizing current and nominal health index values.

It would be appreciated that digital twin regime of the tire is deployed in a cloud network to enable the tire manufacturer to understand usage patterns of the tire and use insights in the design and manufacturing of tires.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of a comprehensive solution for tire health. The tire health has a multivariate dependency on several parameters, many of which need to be estimated/predicted by means of sensors/soft sensors. Therefore, embodiments herein provide a system and method for real time predictions of tire remaining useful life using a tire digital twin. Further, a platform is offered which provides real time insights on the usage of tires under different usage and environmental conditions. Based on which, further developmental decisions can be taken by the manufacturers and fleet owners.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media 5 may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A processor-implemented method for predicting the health of at least one tire of a vehicle comprising:
  receiving, via an input/output interface, one or more vehicular data, a temperature of the tire, and information on vehicle longitudinal and translational forces;
  identifying, via one or more hardware processors, a stationary digital regime, and a non-stationary digital regime of the at least one tire of the vehicle, wherein the stationary digital regime is identified for a stationary vehicle in one or more predefined positions;
  calculating, via the one or more hardware processors, a tread quality index in terms of a tread size and a tread height against a predefined threshold value of the tread quality of the at least one tire;
  calculating, via the one or more hardware processors, a pressure value of the at least one tire of the stationary based on a vehicle load, material characteristics and an ambient temperature of the at least one tire, wherein the calculated pressure value is a cool down pressure value provides a baseline pressure value for training a data-driven model;
  capturing, via the one or more hardware processors, rate of generation of at least one flat spot of the at least one tire based on the calculated tread quality index, the calculated pressure value, the ambient temperature, the vehicle load, and one or more road surfaces;
  calculating, via the one or more hardware processors, a surface index of the tire with respect to a predefined ideal surface for the at least one tire, wherein the vehicle operates on the one or more road surfaces for a predefined time under one or more specific environmental conditions;

determining, via the one or more hardware processors, an operating load index of the at least one tire with respect to a predefined ideal load on the at least one tire, wherein the operating load index includes one or more of operation parameters;

capturing, via the one or more hardware processors, one or more vehicle operation parameters in the form of vehicle operation index;

calculating, via the one or more hardware processors, a tire inflation index based on a pressure saturation value of the at least one tire, the ambient temperature, an initial temperature of the tire, a vehicle speed, an initial pressure value within tire, the calculated surface index, the determined operating load index, and the vehicle operation index;

estimating, via the one or more hardware processors, a variation in the health index of the tire based on the captured flat spot of the tire, the calculated tread quality index, the set of historical operational data of the tire, and the calculated pressure value of the at least one tire of the stationary vehicle; and recommending, via the one or more hardware processors, an optimal usage pattern based on the estimated variation in the health index of the tire of the running vehicle under different environmental conditions and at different vehicle speeds as one of a plurality of operating or non-operating constraints.

2. The processor-implemented method of claim 1, further comprising:

calculating, via the one or more hardware processors, current health index of the tire utilizing variation in the tire health owing to both stationary and non-stationary digital regime of the tire and the tread quality index;

comparing, via the one or more hardware processors, the calculated current health index with respect to a nominal health index of the at least one tire under recommended usage conditions to calculate deviation from normal usage; and defining, via the one or more hardware processors, quantitative remaining useful life of the at least one tire of the vehicle utilizing the current and nominal health index numbers.

3. The processor-implemented method of claim 1, wherein the tire digital twin is deployed in a cloud network to enable a tire manufacturer to recommend one or more usage patterns of the at least one tire to an end user, and use one or more insights in the design and manufacturing of tires.

4. The processor-implemented method of claim 1, wherein the tread quality index is calculated based on a set of operational data of the at least one tire.

5. The processor-implemented method of claim 1, wherein the cool down pressure of the at least one tire provides a baseline pressure value for training a data-driven model and a physics-based model.

6. The processor-implemented method of claim 1, wherein the one or more vehicle operation parameters include vehicle speed, acceleration, braking profile, and steer angle are stored in the form of time averaged values of the one or more operation parameters of the vehicle over the lifetime of the tire.

7. The processor-implemented method of claim 1, wherein the one or more specific environmental conditions include one or more of an ambient temperature, and a relative humidity.

8. The processor-implemented method of claim 1, wherein the one or more vehicle operation parameters include one or more of a vehicle speed, an acceleration, a braking profile, and a steer angle of the vehicle.

9. The processor-implemented method of claim 1, wherein the one or more vehicle operation parameters are stored in the form of time averaged values of the vehicle operation parameters over the lifetime of the tire in the database.

10. The system for predicting health of at least one tire of a vehicle comprising:

an input/output interface for receiving one or more vehicle design data, temperature of the tire, information on vehicle longitudinal and translational forces, set of historical operational data of the tire from at least one predefined data source, environmental data and road type and condition;

one or more hardware processors;

at least one memory in communication with the one or more hardware processors, wherein the one or more hardware processors are configured to execute programmed instructions stored in the memory, to:

identify a stationary digital regime and a non-stationary digital regime of the at least one tire of the vehicle, wherein the stationary digital regime is identified for a stationary vehicle in one or more predefined positions;

calculate a tread quality index in terms of a tread size and a tread height against a predefined threshold value of the tread quality of the at least one tire, wherein the tread quality index is calculated based on a set of operational data of the at least one tire;

calculate a pressure value of the at least one tire of the stationary based on a vehicle load, material characteristics and an ambient temperature of the at least one tire, wherein the calculated pressure value is a cool down pressure value provides a baseline pressure value for training a data-driven model;

capture rate of generation of at least one flat spot of the at least one tire based on the calculated tread quality index, the calculated pressure value, the ambient temperature, the vehicle load, and one or more road surfaces;

calculate a surface index of the tire with respect to a predefined ideal surface for the at least one tire, wherein the vehicle operates on the one or more road surfaces for a predefined time under one or more specific environmental conditions;

determine operating load index of the at least one tire with respect to a predefined ideal load on the at least one tire, wherein the operating load index includes one or more of operation parameters, wherein the one or more of operation parameters comprising a braking force, and a tractive effort;

capture one or more vehicle operation parameters in the form of vehicle operation index;

calculate a tire inflation index based on a pressure saturation value of the at least one tire, the ambient temperature, an initial temperature of the tire, a vehicle speed, an initial pressure value within tire, the calculated surface index, the determined operating load index, and the vehicle operation index;

estimate a variation in the health index of the tire based on the captured flat spot of the tire, the calculated tread quality index, the set of historical operational data of the tire, and the calculated pressure value of the at least one tire of the stationary vehicle; and recommend an optimal usage pattern based on the estimated variation in the health index of the tire of the running vehicle under different environmental conditions and at different vehicle speeds as one of a plurality of operating or non-operating constraints.

11. The system of claim 10, further comprising:

calculating current health index of the tire utilizing variation in the tire health owing to both stationary and non-stationary digital regime of the tire and the tread quality index;

comparing the calculated current health index with respect to a nominal health index of the at least one tire under recommended usage conditions to calculate deviation from normal usage; and defining quantitative remaining useful life of the at least one tire of the vehicle utilizing the current and nominal health index numbers.

12. A non-transitory computer readable medium storing one or more instructions which when executed by one or more processors on a system cause the one or more processors to perform the method comprising:

receiving, via an input/output interface, one or more vehicular data, a temperature of the tire, and information on vehicle longitudinal and translational forces;

identifying, via one or more hardware processors, a stationary digital regime, and a non-stationary digital regime of the at least one tire of the vehicle, wherein the stationary digital regime is identified for a stationary vehicle in one or more predefined positions;

calculating, via the one or more hardware processors, a tread quality index in terms of a tread size and a tread height against a predefined threshold value of the tread quality of the at least one tire;

calculating, via the one or more hardware processors, a pressure value of the at least one tire of the stationary based on a vehicle load, material characteristics and an ambient temperature of the at least one tire, wherein the calculated pressure value is a cool down pressure value provides a baseline pressure value for training a data-driven model;

capturing, via the one or more hardware processors, rate of generation of at least one flat spot of the at least one tire based on the calculated tread quality index, the calculated pressure value, the ambient temperature, the vehicle load, and one or more road surfaces;

calculating, via the one or more hardware processors, a surface index of the tire with respect to a predefined ideal surface for the at least one tire, wherein the vehicle operates on the one or more road surfaces for a predefined time under one or more specific environmental conditions;

determining, via the one or more hardware processors, an operating load index of the at least one tire with respect to a predefined ideal load on the at least one tire, wherein the operating load index includes one or more of operation parameters;

capturing, via the one or more hardware processors, one or more vehicle operation parameters in the form of vehicle operation index;

calculating, via the one or more hardware processors, a tire inflation index based on a pressure saturation value of the at least one tire, the ambient temperature, an initial temperature of the tire, a vehicle speed, an initial pressure value within tire, the calculated surface index, the determined operating load index, and the vehicle operation index;

estimating, via the one or more hardware processors, a variation in the health index of the tire based on the captured flat spot of the tire, the calculated tread quality index, the set of historical operational data of the tire, and the calculated pressure value of the at least one tire of the stationary vehicle; and recommending, via the one or more hardware processors, an optimal usage pattern based on the estimated variation in the health index of the tire of the running vehicle under different environmental conditions and at different vehicle speeds as one of a plurality of operating or non-operating constraints.

13. A non-transitory computer readable medium of claim 12, further comprising:

calculating current health index of the tire utilizing variation in tire health owing to both stationary and non-stationary digital regime of the tire as well as overall tread quality index;

comparing the calculated current health index with respect to the nominal health index of the tire under recommended usage conditions to calculate deviation from normal usage; and defining quantitative remaining useful life of the at least one tire of the vehicle utilizing current and nominal health index numbers.

* * * * *